(12) United States Patent
Abe (10) Patent No.: US 11,754,801 B2
(45) Date of Patent: Sep. 12, 2023

(54) OPTICAL DRIVING APPARATUS AND OPTICAL APPARATUS

(71) Applicant: CANON KABUSHIKI KAISHA, Tokyo (JP)

(72) Inventor: Ryo Abe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 17/178,547

(22) Filed: Feb. 18, 2021

(65) Prior Publication Data

US 2021/0255416 A1 Aug. 19, 2021

(30) Foreign Application Priority Data

Feb. 19, 2020 (JP) ................. 2020-026594

(51) Int. Cl.
*G02B 7/04* (2021.01)
*G03B 17/14* (2021.01)

(52) U.S. Cl.
CPC ............... *G02B 7/04* (2013.01); *G03B 17/14* (2013.01)

(58) Field of Classification Search
CPC ... G02B 7/04; G02B 7/02; G02B 7/00; G03B 17/14; G03B 17/12; G03B 17/00
USPC ........................................... 359/823
See application file for complete search history.

(56) References Cited

U.S. PATENT DOCUMENTS

| 2015/0200612 A1 | 7/2015 | Matsukawa |
| 2015/0323759 A1 | 11/2015 | Torii |
| 2016/0062133 A1 | 3/2016 | Espersen et al. |
| 2018/0113272 A1* | 4/2018 | Kim ................. G02B 27/646 |
| 2019/0011723 A1* | 1/2019 | Park ................... G03B 5/00 |
| 2019/0196137 A1 | 6/2019 | Ushioda |
| 2019/0196138 A1* | 6/2019 | Ushioda ............... G02B 7/09 |

(Continued)

FOREIGN PATENT DOCUMENTS

| JP | 2009-139516 A | 6/2009 |
| JP | 2018-180352 A | 11/2018 |
| WO | 2019/084728 A1 | 5/2019 |

OTHER PUBLICATIONS

British Search Report dated Sep. 20, 2021, a copy of which is enclosed, that issued in the corresponding British Patent Application No. 2101801.5.

(Continued)

*Primary Examiner* — William R Alexander
(74) *Attorney, Agent, or Firm* — Cowan, Liebowitz & Latman, P.C.

(57) ABSTRACT

An optical driving apparatus includes an actuator configured to drive an optical element holder in an optical axis direction, a first rolling member and a second rolling member each fixed rollably to the optical element holder, a first guide member configured to guide the optical element holder in the optical axis direction, a second guide member configured to restrict the optical element holder from rotating around the first guide member, a first biasing member configured to generate a first biasing force to press the first rolling member against the first guide member, and a second biasing member configured to generate a second biasing force to press the second rolling member against the second guide member. The first biasing member generates the first biasing force as a magnetic force. A reaction force of the second biasing force acts on the actuator.

13 Claims, 8 Drawing Sheets

(56) References Cited

U.S. PATENT DOCUMENTS

2019/0271825 A1     9/2019   Kawanabe
2020/0333686 A1*   10/2020   Kim ...................... G03B 30/00

OTHER PUBLICATIONS

The above documents were cited in a Jul. 17, 2023 German Office Action, which is enclosed without an English Translation, that issued in German Patent Application No. 102021101636.3.

* cited by examiner

OPTICAL DRIVING APPARATUS AND OPTICAL APPARATUS

BACKGROUND OF THE INVENTION

Field of the Invention

The present invention relates to an optical driving apparatus for driving an optical element, such as a lens, by an actuator in an optical apparatus, such as a digital camera and an interchangeable lens.

Description of the Related Art

Some optical driving apparatuses guide a lens holder that holds a lens in an optical axis direction using a guide member such as a guide bar. These lens driving apparatuses bias (or urge) the lens holder against the guide member using a biasing force of an elastic member so that the lens holder can be guided steadily (or with no gap or backlash). Japanese Patent Laid-Open No. ("JP") 2009-139516 discloses an optical driving apparatus in which a connector that connects an actuator and a lens holder to each other is biased toward the actuator by a biasing force generated by an elastic member, and a reaction force of the biasing force is used to bias the lens holder against the guide member.

The optical driving apparatus disclosed in JP 2009-139516 needs a strong biasing force for biasing the lens holder against the guide member so that the lens holder can be steadily guided in various orientations. However, as the biasing force becomes stronger, the biasing force for biasing the connector toward the actuator also increases. As a result, the operation of the actuator, or driving of the lens may be affected.

SUMMARY OF THE INVENTION

The present invention provides an optical driving apparatus that can satisfactorily guide a lens holder while reducing negative influence on driving of an actuator.

An optical driving apparatus according to one aspect of the present invention includes an optical element holder configured to hold an optical element, an actuator configured to drive the optical element holder in an optical axis direction, a first rolling member and a second rolling member each fixed rollably to the optical element holder, a first guide member configured to contact the first rolling member and to guide the optical element holder in the optical axis direction, a second guide member configured to contact the second rolling member and to restrict the optical element holder from rotating around the first guide member, a first biasing member configured to generate a first biasing force that biases the optical element holder so that the first rolling member is pressed against the first guide member, and a second biasing member configured to generate a second biasing force that biases the optical element holder so that the second rolling member is pressed against the second guide member. The first biasing member generates the first biasing force as a magnetic force. A reaction force of the second biasing force acts on the actuator. An optical apparatus including the above optical driving apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
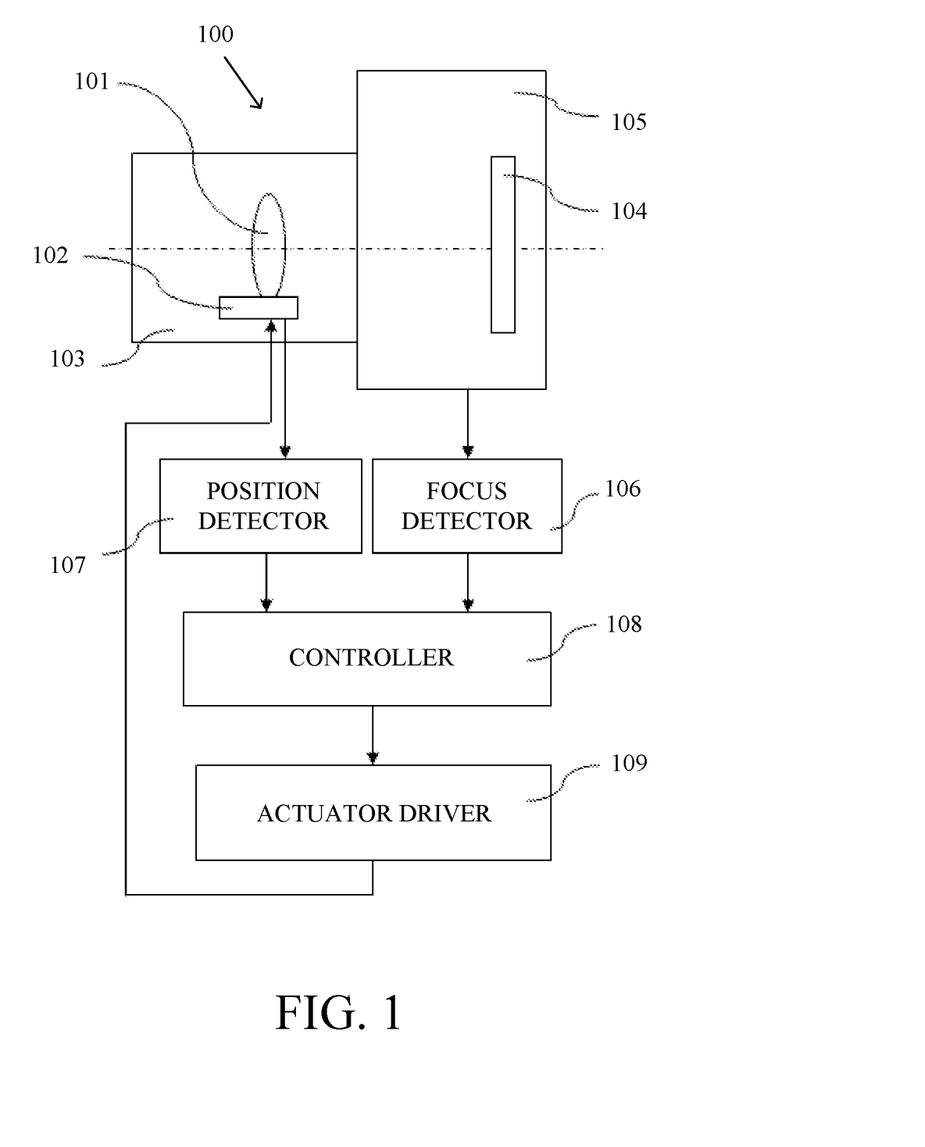
FIG. 1 is a block diagram showing a configuration of a lens driving apparatus according to a first embodiment of the present invention.

FIG. 1 illustrates a configuration of an image pickup apparatus (digital camera) 100, which is an optical apparatus including a lens driving apparatus serving as an optical driving apparatus according to a first embodiment of the present invention. The image pickup apparatus 100 includes a lens barrel 103 and a camera body 105. The lens barrel 103 positions an imaging optical system including a focusing lens 101 serving as an optical element, the lens driving apparatus including an actuator 102 for driving the lens 101 in the optical axis direction, and a position detector 107 for detecting the position of the lens 101 in the optical axis direction.

The camera body 105 includes an image sensor 104 that captures (photoelectrically converts) an optical image formed by the imaging optical system, and a focus detector 106 that detects a focus state of the optical image formed on the image sensor 104. The camera body 105 further includes a controller 108 that controls the actuator 102 via an actuator driver 109 so that the position of the lens 101 detected by the position detector 107 moves to an in-focus position according to the focus detection result by the focus detector 106.

The actuator 102 is a vibration type actuator, and has a movable portion that generates vibrations and a fixed portion with which the movable portion is in pressure contact. The movable portion moves in the optical axis direction relative to the fixed portion. A reaction force of a second biasing force, which will be described later, acts as a force that presses the movable portion against the fixed portion. The actuator 102 is not limited to the vibration type actuator, and can use various actuators such as a stepping motor and a voice coil motor.

Figure 2A:
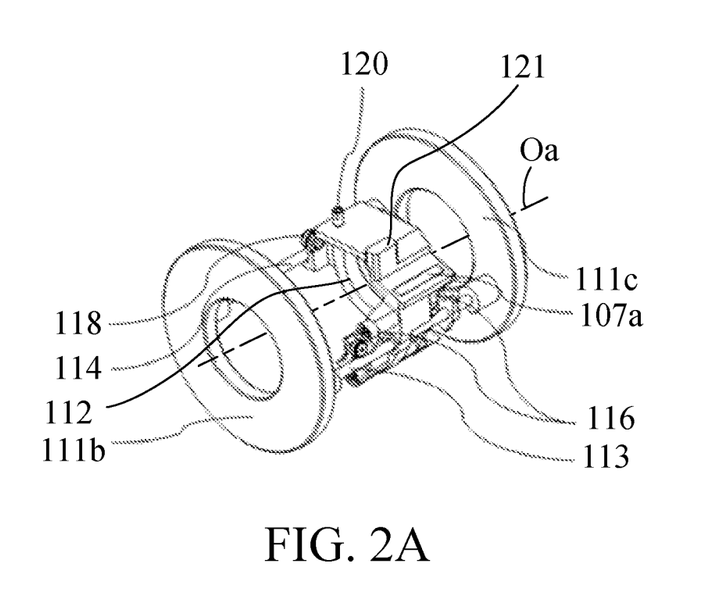
FIGS. 2A and 2B are a perspective view and an exploded perspective view of the lens driving apparatus according to the first embodiment.
Figure 2B:
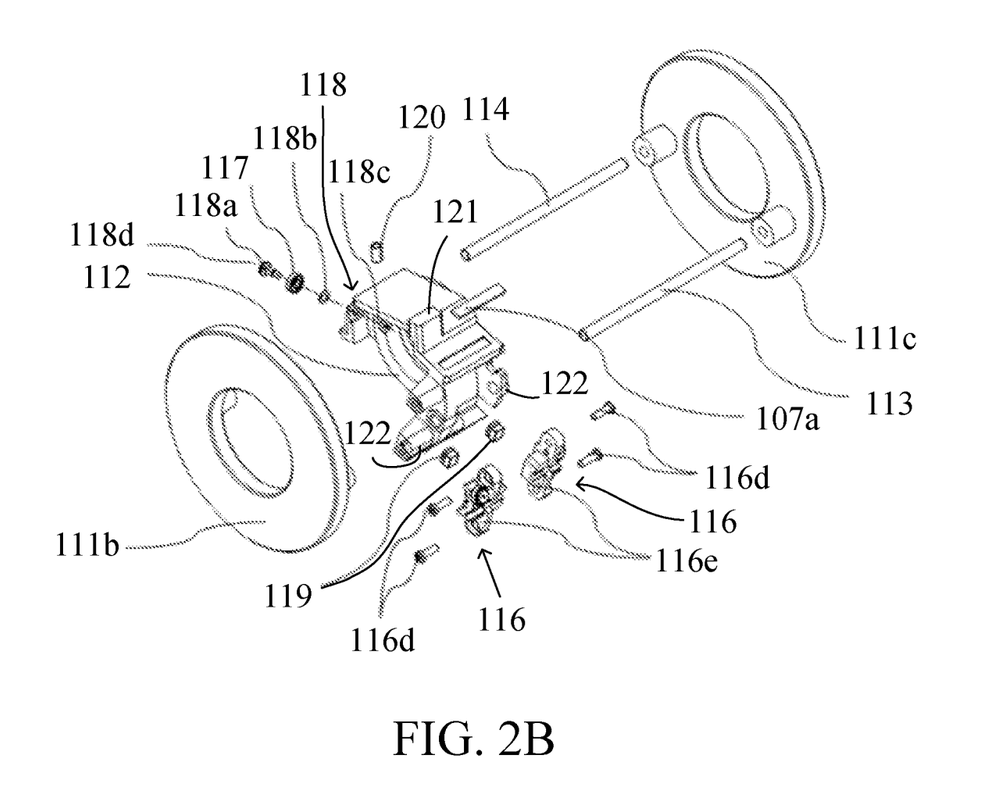
Figure 3A:
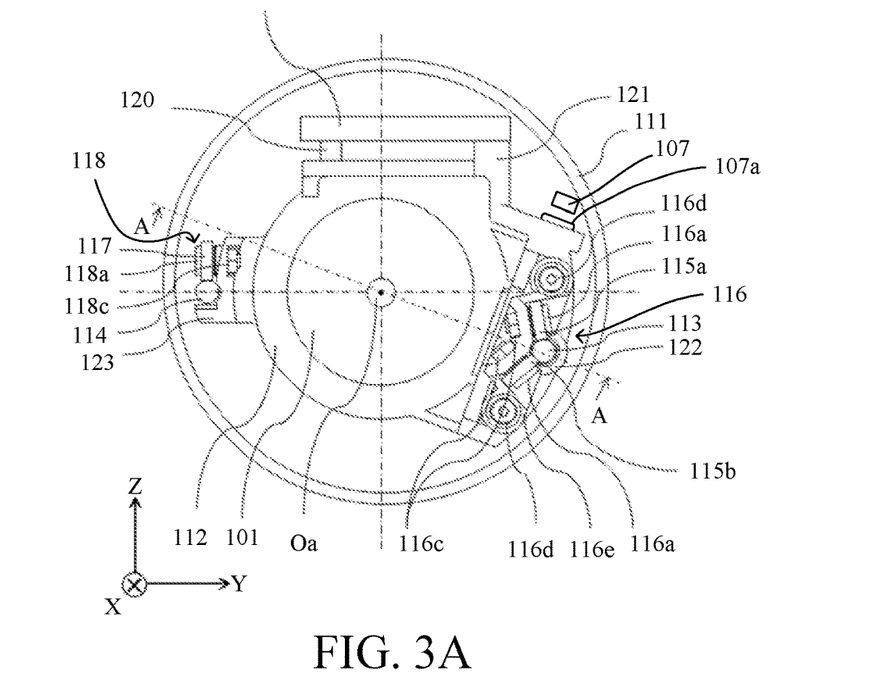
FIGS. 3A and 3B are a front sectional view and a side sectional view of the lens driving apparatus according to the first embodiment.
Figure 3B:
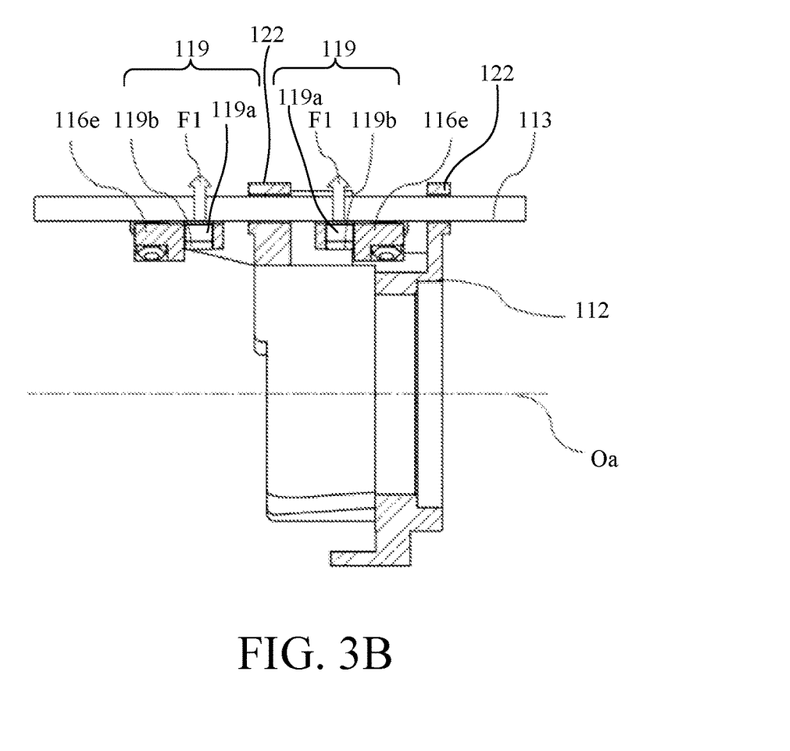
Figure 4A:
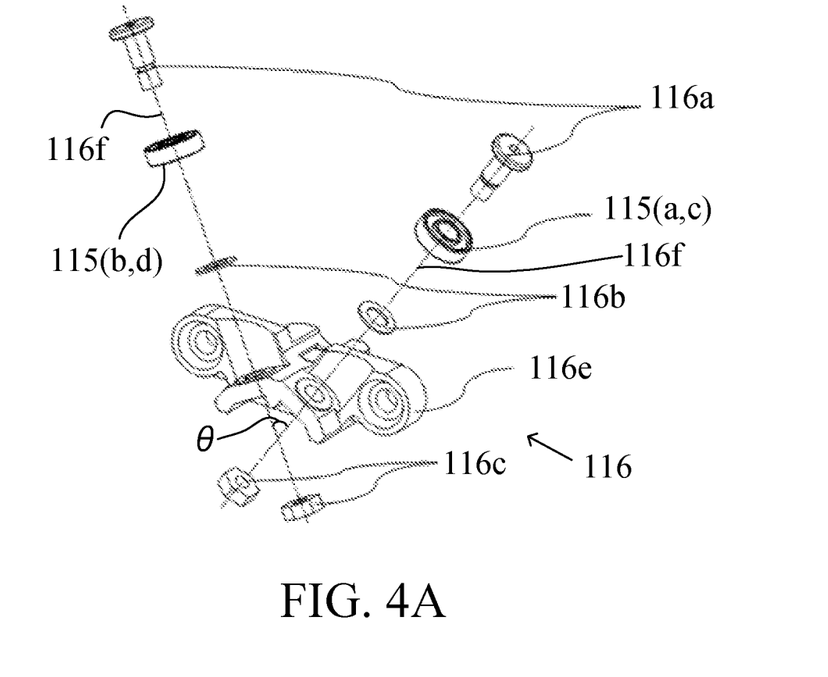
FIGS. 4A and 4B are an exploded perspective view and a sectional view of a first rolling member holder provided in the lens driving apparatus according to the first embodiment.
Figure 4B:
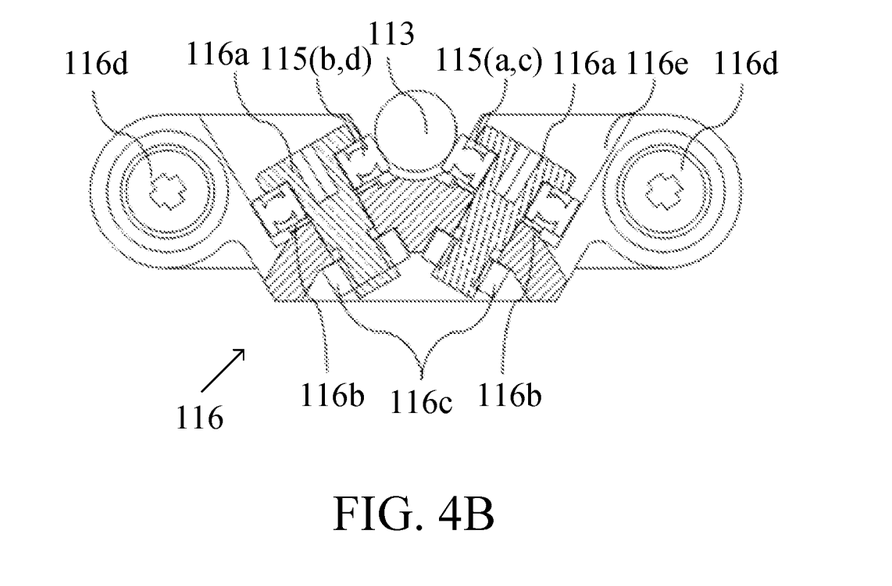

FIG. 2A illustrates an assembled state of the lens driving apparatus, and FIG. 2B illustrates the lens driving apparatus in an exploded manner. FIG. 3A illustrates a section of the lens driving apparatus viewed from the direction in which the optical axis Oa of the imaging optical system (lens 101) extends (optical axis direction). Assume that an X direction is the optical axis direction, a Z direction is a direction in which the actuator 102 is disposed, and a Y direction is a direction orthogonal to the X direction and the Z direction. FIG. 3B illustrates a section taken along a line A-A in FIG. 3A. FIG. 4A illustrates the first rolling member holder to be described later in an exploded manner, and FIG. 4B illustrates a section orthogonal to the optical axis of the first rolling member holder.

A fixed lens barrel 111 illustrated in FIG. 3A is a cylindrical member and is fixed in the lens barrel 103. A front fixed member 111b and a rear fixed member 111c illustrated in FIGS. 2A and 2B are fixed to front and rear openings of the fixed lens barrel 111 located on the front and rear sides in the optical axis direction, respectively. The front fixed member 111b and the rear fixed member 11c hold a front end and a rear end of the first guide member 113 and the second guide member 114, which will be described later. The lens holder 112 serving as an optical element holder is a member that holds the lens 101 and can move in the optical axis direction relative to the fixed lens barrel 111. The lens holder 112 includes two first rolling member holders 116 each of which rollably hold two of four first rolling members 115 (a to d), which will be described later, and a second rolling member holder 118 for rollably holding a second rolling member 117.

The first guide member 113 is a round rod-shaped member extending in the optical axis direction as illustrated in FIG. 2A. As illustrated in FIGS. 2A, 2B, and 3A, the first guide member 113 is sandwiched in a section orthogonal to the optical axis by two (paired) first rolling members 115a and 115b on the front side of the lens holder 112, and two (paired) first rolling members 115c and 115d on the rear side of the lens holder 112, and guides the lens holder 112 in the optical axis direction. The first guide member 113 is made of a magnetic material. The first guide member 113 may be a rod-shaped member having a polygonal section.

The second guide member 114 is a round rod-shaped member extending in the optical axis direction as illustrated in FIG. 2A, and restricts the lens holder 112 from rotating around the first guide member 113 when the second rolling member 117 contacts the second guide member 114 in a section orthogonal to the optical axis as illustrated in FIG. 3A. The second guide member 114 may be a rod-shaped member or a plate-shaped member having a polygonal section.

As illustrated in FIG. 3A, the first rolling members 115 (a to d) are rollably held two by two by the two first rolling member holders 116 and contact the first guide member 113. This embodiment uses a ball bearing for the first rolling member 115. However, any members may be a rolling member such as a roller or a ball.

As illustrated in FIGS. 4A and 4B, each first rolling member holder 116 includes a shaft screw 116a, a washer 116b, a nut 116c, a screw 116d, and a holding base 116e. The holding base 116e is a resin member that holds the first rolling member 115, and is fixed to the lens holder 112 by the screw 116d.

The shaft screw 116a includes a shaft portion to be engaged with or press-fitted to the first rolling member 115, and a screw portion to which the nut 116c is screwed, and positions and fixes the first rolling member 115 to the holding base 116e. By stacking the first rolling member 115, the washer 116b, and the holding base 116e in this order and by fixing them to the holding base 116e by the shaft screw 116a and the nut 116c, the first rolling member 115 is rollably held around the shaft 116f. An angle θ formed by the axes 116f passing through the centers of the pair of first rolling members 115 held by a single holding base 116e is 60°. However, the angle θ may be another angle.

If the fastening force between the shaft screw 116a and the nut 116c becomes stronger, the resin holding base 1/6e may contact the first rolling member 115 and get deformed and thus the washer 116b inserted between the first rolling member 115 and the holding base 116e prevents the deformation.

The first biasing members 119 are fixed at two locations of the lens holder 112 between the two holding bases 116e, as illustrated in FIGS. 2A and 3A, respectively. The first biasing member 119 includes a magnet 119a and a yoke 119b, and gives, as illustrated in FIG. 3B, a first biasing force F1 to the lens holder 112 by a magnetic force (magnetic attraction force) acting with the first guide member 113 which is a magnetic material. The magnetizing direction of the magnet 119a goes to the first guide member 113, and the direction of the first biasing force F1 is also goes to the first guide member 113. The first biasing force F1 presses the first rolling member 115 against the first guide member 113. The pole of the magnet 119a may be monopole or multi-pole, and in the case of monopole, the yoke 119b becomes unnecessary. One or three or more first biasing members 119 may be provided.

As the lens holder 112 moves in the optical axis direction while the first rolling member 115 is pressed against the first guide member 113, the first rolling member 115 rolls around the shaft 116f. Therefore, the lens holder 112 can be moved while being guided in the optical axis direction with a low frictional load. Since the position of the holding base 116e relative to the lens holder 112 is adjustable when the holding base 116e, which is a separate member from the lens holder 112, is fixed to the lens holder 112 with the screw 116d, the relative positions between the optical axis Oa of the lens 101 and the first and second guide members 113 and 114 can be changed. Thereby, it is possible to absorb the deviation in the positional relationship between the optical axis Oa of the lens 101 and the first and second guide members 113 and 114 due to manufacturing errors, and they can be positioned with high accuracy.

As illustrated in FIGS. 2A and 2B, the second rolling member 117 is held by the second rolling member holder 118 provided on the side opposite to the first rolling member holder 116 with the optical axis Oa of the lens holder 112, and contacts the second guide member 114. In this embodiment, a ball bearing is also used for the second rolling member 117, but any rolling members such as a roller or a rolling ball may be used.

As illustrated in FIG. 2B, the second rolling member holder 118 includes a shaft screw 118a, a washer 118b, and a nut 118c. The shaft screw 118a has a shaft portion that is engaged with or press-fitted into the second rolling member 117, and a screw portion into which the nut 118c is screwed, and positions and fixes the second rolling member 117 to the lens holder 112. By stacking the second rolling member 117, the washer 118b, and the lens holder 112 in this order and by fastening the nut 118c to the shaft screw 118a, the second rolling member 117 is held rollably around the shaft 118d. The reason why the washer 118b is disposed between the second rolling member 117 and the lens holder 112 is the same as the washer 116b of the first rolling member holder 116.

As illustrated in FIGS. 2B and 3A, the second biasing member 120, which is an elastic member such as a spring, is disposed between the lens holder 112 and the actuator 102. The actuator 102 is connected to a connector 121 provided on the lens holder 112 steadily in the optical axis direction. One end of the second biasing member 120 contacts the movable portion of the actuator 102, and the other end contacts the lens holder 112 and is compressed, so as to give to the lens holder 112 a second biasing force F2 as an elastic force for pressing that the second rolling member 117 against the second guide member 114. The second biasing force F2 is smaller than the first biasing force F1.

When the actuator 102 is driven and the lens holder 112 moves in the optical axis direction w % bile the second rolling member 117 contacts the second guide member 114, the second rolling member 117 rolls around the axis 118d. Therefore, the lens holder 112 can be moved while being guided in the optical axis direction with a low friction load, and the lens holder 112 can be restricted from rotating around the first guide member 113.

The lens holder 112 (or the lens 101) can be steadily guided with a low load in the optical axis direction by a guide mechanism that includes the first and second guide members 113 and 114, the first and second rolling members 115 and 117, and the first and second biasing members 119 and 120 described above.

As illustrated in FIGS. 2B, 3A, and 3B, the lens holder 112 has a first stopper portion 122 and a second stopper portion 123. The first stopper portion 122 is engaged with the first guide member 113 and prevents the lens holder 112 from being separated from the first guide member 113 by a predetermined distance or more. More specifically, when the image pickup apparatus 100 receives an external force such as a drop impact and the lens holder 112 is displaced in the direction in which the first rolling member 115 and the first guide member 113 are separated from each other, the first stopper portion 122 is engaged with (contacts) the first guide member 113. Thereby, the first rolling member 115 is prevented from falling off from the first guide member 113, the first biasing force F1 is prevented from being weaker, and the lens holder 122 can return to its original position.

On the other hand, the second stopper portion 123 is engaged with the second guide member 114 and prevents the lens holder 112 from being separated from the second guide member 114 by a predetermined distance or more. More specifically, when the image pickup apparatus 100 receiving the external force displaces the lens holder 112 in the direction in which the second rolling member 117 and the second guide member 114 are separated from each other, the second stopper portion 123 is engaged with (contacts) the second guide member 114, and prevents the lens holder 112 from colliding with the fixed lens barrel 11 or damaging the actuator 102.

The position detector 107 illustrated in FIG. 1 includes a sensor that optically or magnetically reads a periodic pattern provided on a scale 107a held by the lens holder 112, as illustrated in FIGS. 2A, 2B, and 3A. The position detector 107 outputs a periodic signal that varies according to the position of the lens holder 112 in the optical axis direction, and the controller 108 detects the position of the lens holder 112 in the optical axis direction based on the periodic signal.

Figure 5:
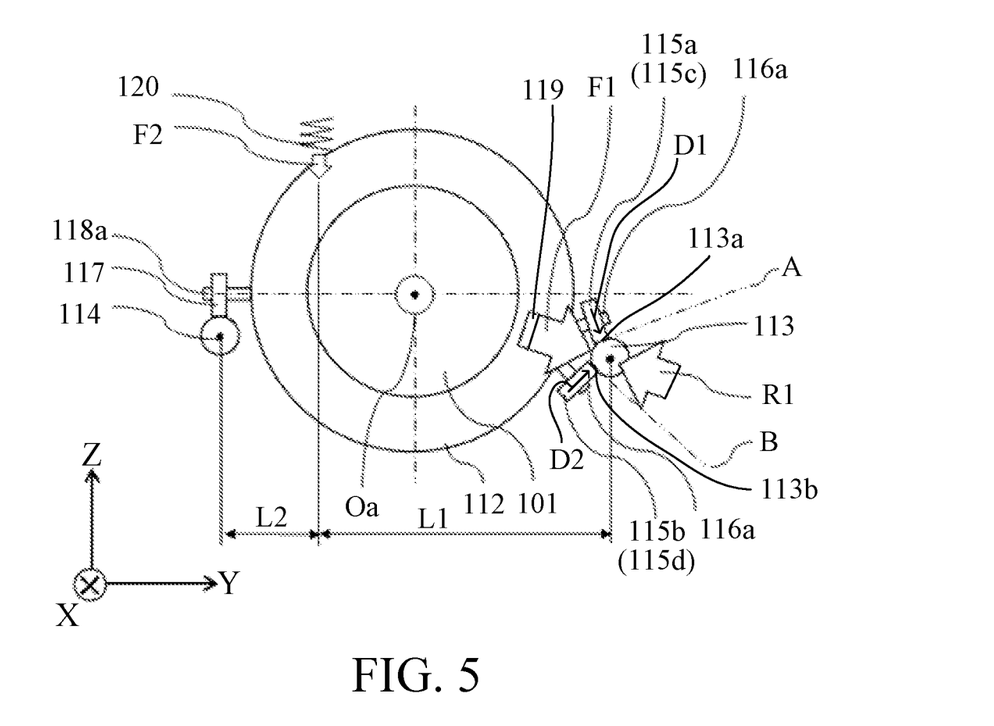
FIG. 5 illustrates a biasing mechanism in the lens driving apparatus according to the first embodiment.

Referring now to FIG. 5, a description will be given of a configuration that biases the lens holder 112 toward the first and second guide members 113 and 114. FIG. 5 schematically illustrates the lens holder 112, first rolling members 115a and 115b, the first biasing member 119, the first guide member 113, the second rolling member 117, the second biasing member 120, and the second guide member 114 in a plane orthogonal to the optical axis direction. The first rolling members 115c and 115d are disposed at positions overlapping the first rolling members 115a and 115b in the depth direction orthogonal to the paper plane of FIG. 5.

As described above, in the lens holder 112, the first biasing member 119 including the magnet 119a is biased toward the first guide member 113 as a magnetic body by a first biasing force F1 as a magnetic attraction force generated with the first guide member 113, and biased toward the second guide member 114 by a second biasing force F2 as an elastic force generated by the second biasing member 120, which is an elastic member.

In FIG. 5, the first rolling member 115a (115c) and the first rolling member 115b (115d) contact a first position 113a and a second position 113b in the first guide member 113, which are different from each other, in a first direction D1 and a second direction D2, which are different from each other. Assume that a first rolling plane A is a plane that passes through the first position 113a and is orthogonal to the first direction D1. A second rolling plane B is a plane that passes through the second position 113b and is orthogonal to the second direction D2. The first rolling surface A and the second rolling surface B are parallel to the optical axis Oa. The first biasing member 119 generates the first biasing force F1 in a direction of internally dividing the angle formed between the first rolling surface A and the second rolling surface B, in other words, a direction going to the first guide member 113 (passing through the first guide member 113). When the first biasing force F1 is generated in this direction, the first rolling members 115a to 115d are pressed against the first guide member 113 with substantially equal forces.

Since the first biasing force F1 is a force generated between the first biasing member 119 and the first guide member 113, the reaction force R1 by the first biasing force F1 is generated in the first guide member 113. Therefore, the first biasing force F1 is completed in the first guide member 113, the first rolling member 115, the first rolling member holder 116, and the first biasing member 119, and the first biasing force F1 is transmitted only to the first guide member 113 among the first guide member 113 and the second guide member 114. That is, the first biasing force F1 biases the lens holder 112 toward the first guide member 113 without biasing the lens holder 112 toward the second guide member 114.

In FIG. 5, similar to FIG. 3A, the X direction is the optical axis direction, the Z direction is the direction in which the actuator 102 is disposed when viewed from the optical axis Oa. and the Y direction is the direction orthogonal to the X and Z directions. Assume that L1 is a distance between the first guide member 113 and the second biasing member 120 (a position where the second biasing force F2 is generated) in the Y direction (the direction orthogonal to the direction of the second biasing force F2), and L2 is a distance between the second guide member 114 and the second biasing member 120. In this embodiment, the second biasing member 120 generates the second biasing force F2 so that L2 is smaller than L1. By generating the second biasing force F2 in this way, even if the second biasing force F2 is small and the orientation of the image pickup apparatus 100 changes, the second biasing member 120 can be steadily pressed against the second guide member 114.

In this embodiment, the first guide member 113 is made of the magnetic material and the first biasing member 119 includes the magnet 119a, but the first guide member 113 may include a magnet and the first biasing member 119 may be made of a magnetic material.

Figure 6A:
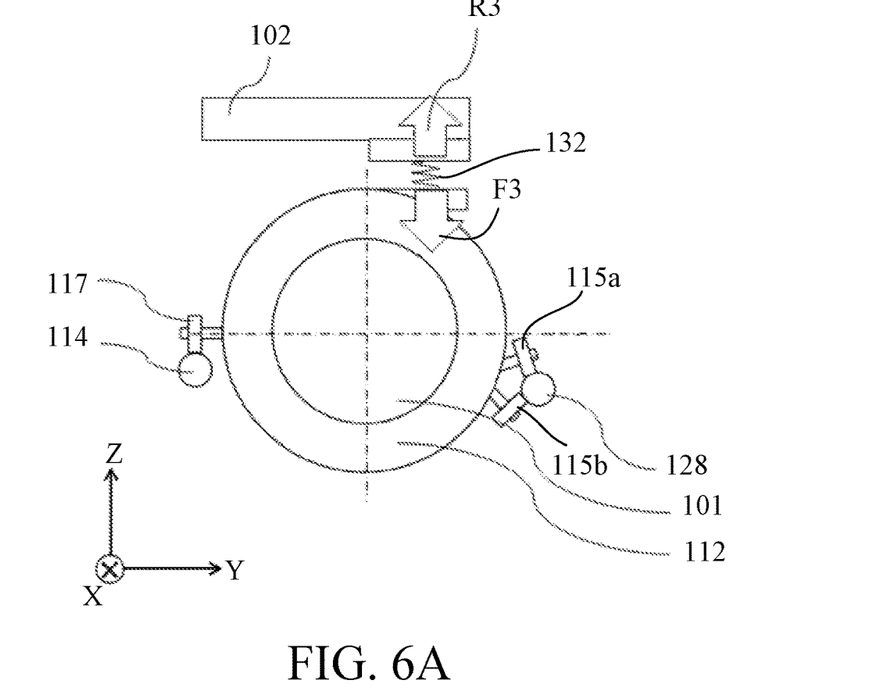
FIGS. 6A and 6B illustrate effects of the lens driving apparatus according to the first embodiment.
Figure 6B:
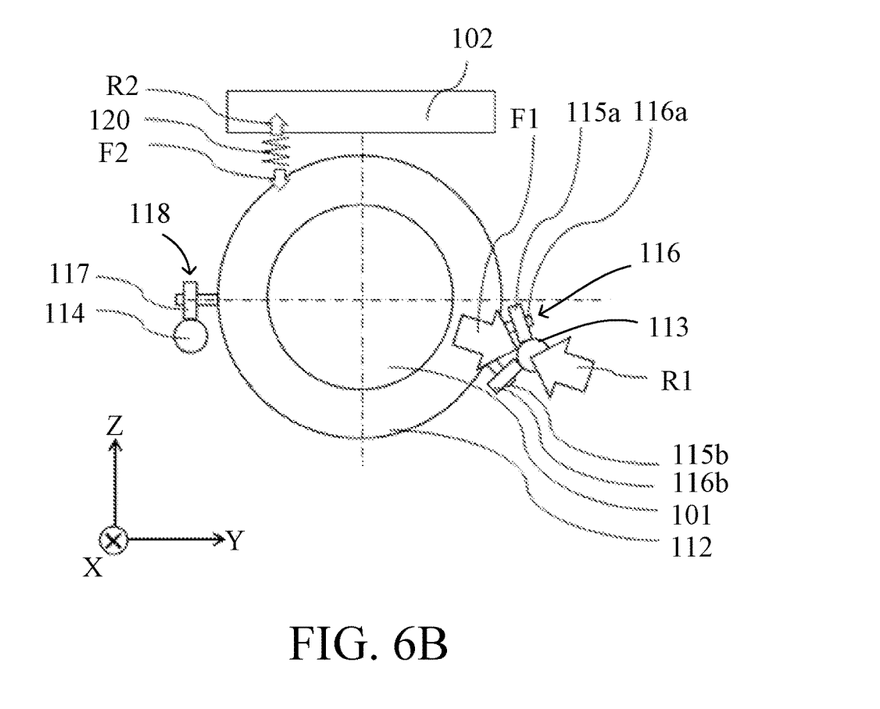

Referring now to FIG. 6B, a description will be given of effects of this embodiment. FIG. 6A illustrates a conventional configuration as a comparative example, and those components which are common to those of this embodiment will be designated by the same reference numerals as those of this embodiment.

Even in the conventional configuration illustrated in FIG. 6A, the first rolling members 115a and 115b contact the first guide member 113, and the second rolling member 117 contact the second guide member 114. However, the first rolling members 115a and 115b and the second rolling member 117 are pressed against the first guide member 113 and the second guide member 114, respectively, by the biasing force F3 generated by the biasing member 132 as an elastic member such as a spring disposed between the lens holder 112 and the movable portion of the actuator 102. The reaction force R3 of the biasing force F3 is transmitted to the actuator 102.

Here, if the lens 101 held by the lens holder 112 is heavy, it is necessary to increase the biasing force F3, in order to press the first rolling members 115a and 115b and the second rolling member 117 against the first guide member 113 and the second guide member 114 by the biasing force F3 in various orientations of the image pickup apparatus. As a result, the reaction force R3 acting on the actuator 102 also increases, so that the driving load and frictional resistance of the actuator 102 increase, and the lens holder 112 may not be satisfactorily driven.

On the other hand, in this embodiment illustrated in FIG. 6B, as described with reference to FIG. 5, the first biasing force F1 and its reaction force R1 are completed in the first guide member 113, the first rolling member 115, the first rolling member holder 116, and the first biasing member 119, and thus the reaction force R1 is not transmitted to the second guide member 114 or the actuator 102. The second biasing force F2 and its reaction force R2 are transmitted to the actuator 102 similar to the conventional configuration. The conventional biasing force F3 biases the lens holder 112 to both the first guide member 113 and the second guide member 114, whereas the second biasing force F2 biases the lens holder 112 only to the second guide member 114. Moreover, since the first biasing force F1 is larger than the second biasing force F2, the second biasing force F2 is much smaller than the conventional biasing force F3.

In this embodiment, when the lens 101 is heavy, it is necessary to increase both the first biasing force F1 and the second biasing force F2, in order to press the first rolling member 115 and the second rolling member 117 against the first guide member 113 and the second guide member 114 by the first biasing force F1 and the second biasing force F2 in various orientations of the image pickup apparatus 100. At this time, the reaction force R2 of the second biasing force F2 also becomes larger, but it is much smaller than the reaction force R3 of the conventional biasing force F3. Therefore, the reaction force R2 acting on the actuator 102 does not become too large, and the lens holder 112 can be satisfactorily driven while the driving load and frictional resistance of the actuator 102 are restrained from increasing.

Second Embodiment

Figure 7A:
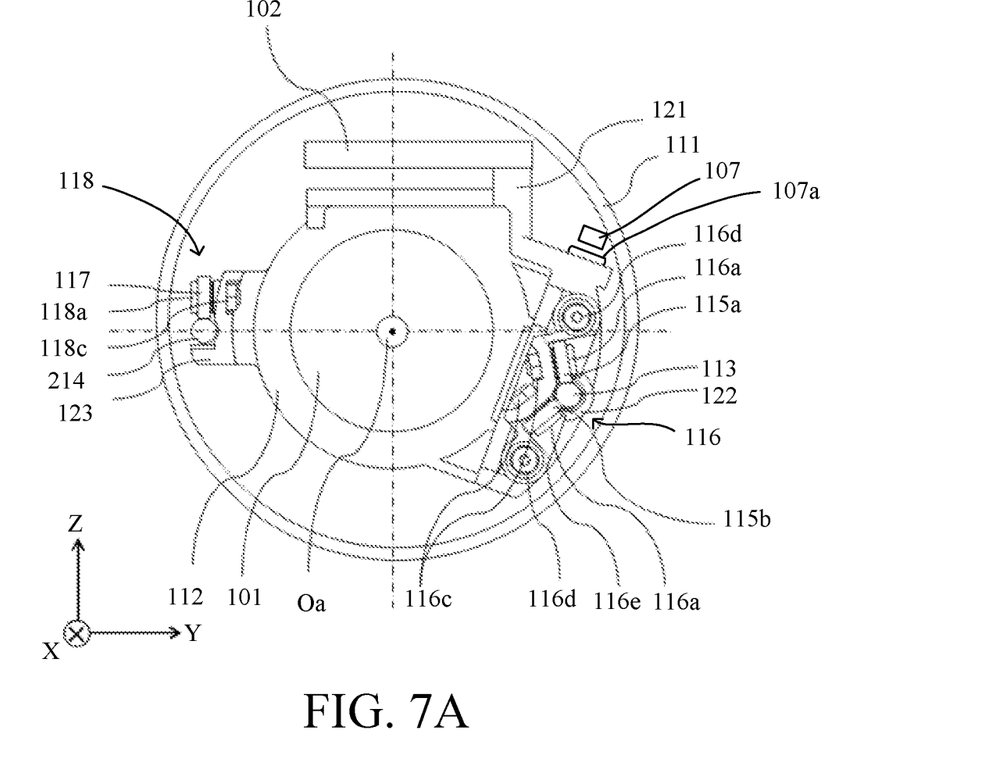
FIGS. 7A and 7B are a front sectional view and a side sectional view illustrating a guide mechanism in a lens driving apparatus according to a second embodiment of the present invention.
Figure 7B:
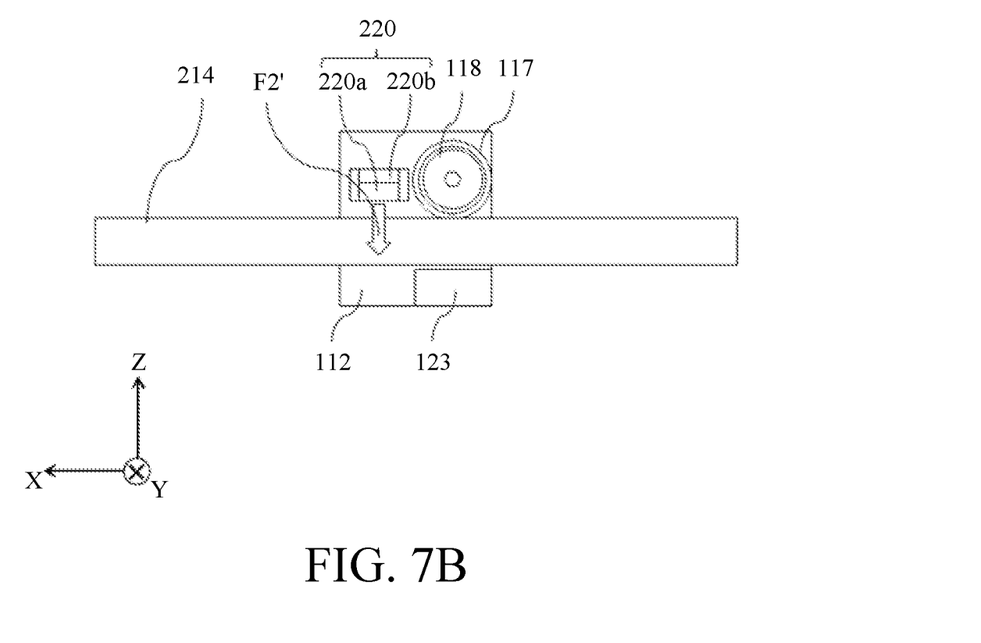

Referring now to FIGS. 7A and 7B, a description will be given of a lens driving apparatus according to a second embodiment of the present invention. Those elements in this embodiment, which are corresponding elements in the first embodiment, will be designated by the same reference numerals, and a description thereof will be omitted. FIG. 7A illustrates the lens driving apparatus according to the second embodiment of the present invention viewed from the optical axis direction. The X, Y and Z directions are defined similarly to the first embodiment (FIG. 3A). FIG. 7B illustrates the configuration around a second guide member 214 viewed from the −Y direction.

The second guide member 214 is a round rod-shaped member that restricts the lens holder 112 from rotating around the first guide member 113. The second guide member 214 may be a rod-shaped member having a polygonal section. The second rolling member 117 fixed to the second rolling member holder 118 of the lens holder 112 contacts the second guide member 214. The second guide member 214 is made of a magnetic material. The second rolling member 117 is fixed to the lens holder 112 by using the shaft screw 118a, the unillustrated washer, and the nut 118c, similar to the first embodiment.

As illustrated in FIG. 7B, fixed behind the second guide member 214 in the lens holder 112 in the X direction is a second biasing member 220 that includes a magnet 220a and a yoke 220b and gives a second biasing force F2' to the lens holder 112 by a magnetic force (magnetic attraction force) acting with the second guide member 214, which is a magnetic material. The magnetizing direction of the magnet 220a is the direction toward the second guide member 214, and the direction of the second biasing force F2' is also the direction toward the second guide member 214. The second biasing force F2' presses the second rolling member 117 against the second guide member 214. The second biasing force F2' is smaller than the first biasing force F1. The magnet 220a may be monopole or multi-pole, and in the case of the monopole, the yoke 220b becomes unnecessary. Two or more second biasing members 220 may be provided.

When the actuator 102 is driven and the lens holder 112 moves in the optical axis direction w % bile the second rolling member 117 contacts the second guide member 214, the second rolling member 117 rolls. Therefore, the lens holder 112 can be moved while being guided in the optical axis direction with a low frictional load, and the lens holder 112 can be restricted from rotating around the first guide member 113.

Figure 8:
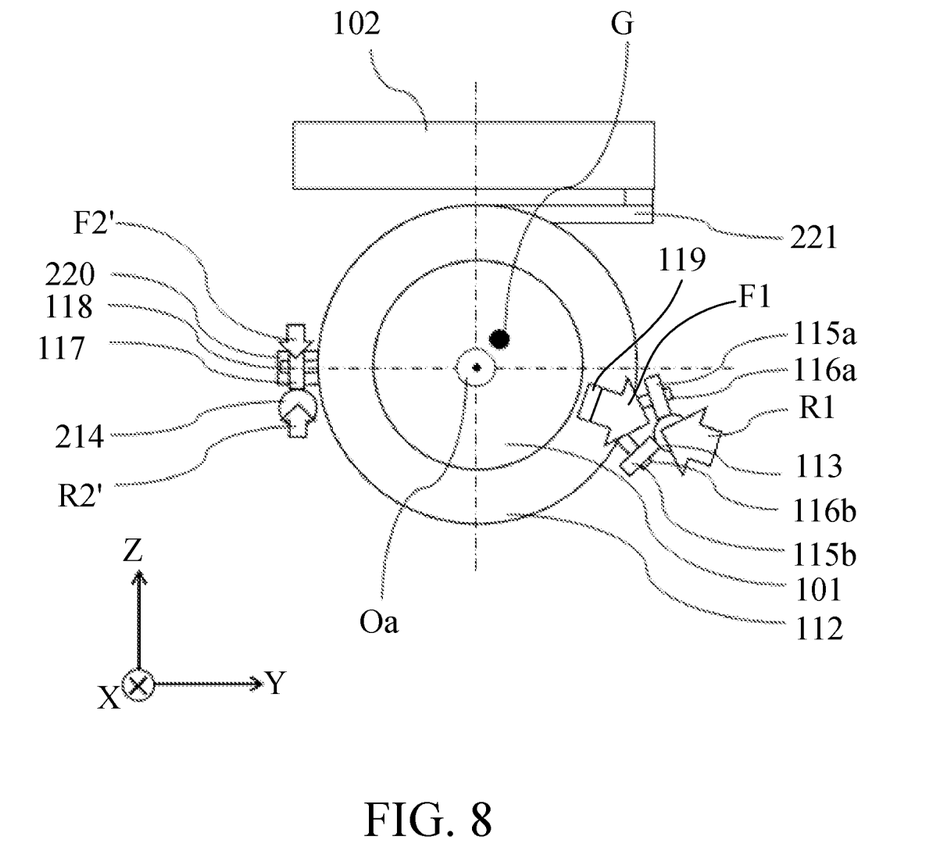
FIG. 8 illustrates a biasing mechanism in the lens driving apparatus according to the second embodiment.

Referring now to FIG. 8, a description will be given of a configuration that biases the lens holder 112 toward the first and second guide members 113 and 214. FIG. 8 schematically illustrates the lens holder 112, the first rolling members 115a and 115b, the first biasing member 119, the first guide member 113, the second rolling member 117, the second biasing member 220, and the second guide member 214 viewed from the optical axis direction. The configuration that biases the lens holder 112 toward the first guide member 113 by the first biasing member 119 is the same as that in the first embodiment.

As described above, the second biasing force F2' generated between the second biasing member 220 and the second guide member 214 biases the lens holder 112 toward the second guide member 214. The reaction force R2' by the second biasing force F2' is generated in the second guide member 214. Therefore, the second biasing force F2' and the reaction force R2' are completed in the second guide member 214, the second rolling member 117, and the second biasing member 220, and is not transmitted to the first guide member 113 or the actuator 102.

The second biasing force F2' does not pass between the center of gravity G of the lens holder 112 including the lens 101 and the first guide member 113, but acts on the lens holder 112 so as to pass between the center of gravity G and the second guide member 214. Therefore, even if the second biasing force F' is small, the second rolling member 117 can be steadily pressed against the second guide member 214 regardless of the orientation of the image pickup apparatus.

In this embodiment, the second guide member 214 is made of a magnetic material and the second biasing member 220 includes the magnet 220a, but the second guide member 214 may be a magnet and the second biasing member 220 may be made of a magnetic material.

A description will be next given of effects of this embodiment. Similar to the first embodiment, the first biasing force F1 and its reaction force R1 are completed in the first guide member 113, the first rolling member 115, the first rolling member holder 116, and the first biasing member 220, and thus the reaction force R1 is not transmitted to the second guide member 214 or the actuator 102. The second biasing force F2' and its reaction force R2' are completed in the second guide member 214, the second rolling member 117, the second rolling member holder 118, and the second biasing member 220, and thus the reaction force R2' is not transmitted to the first guide member 113 or the actuator 102.

When the lens 101 is heavy, it is necessary to increase both the first biasing force F1 and the second biasing force F2', in order to press the first rolling member 115 and the second rolling member 117 against the first guide member 113 and the second guide member 214 by the first biasing force F1 and the second biasing force F2' in various orientations of the image pickup apparatus. At this time, the reaction force R1 of the first biasing force F1 and the reaction force R2' of the second biasing force F2' are also increased, but neither the reaction force R1 nor the reaction force R2' acts on the actuator 102, so that the lens holder 112 can be satisfactorily driven while the driving load and frictional resistance in the actuator 102 are restrained from increasing.

In each of the above embodiments, the optical element holder holds the lens, but the optical element holder may hold an optical element other than the lens, such as an optical filter and a diaphragm.

Each embodiment can satisfactorily guide the optical element holder while reducing the influence of the actuator on driving of the optical element holder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-026594, filed on Feb. 19, 2020 which is hereby incorporated by reference herein in its entirety.

What is claimed is:

1. An optical driving apparatus comprising:
an optical element holder configured to hold an optical element;
an actuator configured to drive the optical element holder in an optical axis direction;
a first rolling member and a second rolling member each fixed rollably to the optical element holder;
a first guide member configured to contact the first rolling member and to guide the optical element holder in the optical axis direction;
a second guide member configured to contact the second rolling member and to restrict the optical element holder from rotating around the first guide member;
a first biasing member configured to generate a first biasing force that biases the optical element holder so that the first rolling member is pressed against the first guide member; and
a second biasing member configured to generate a second biasing force that biases the optical element holder so that the second rolling member is pressed against the second guide member,
wherein the first biasing force biases the optical element holder toward the first guide member without biasing the optical element holder toward the second guide member, and
wherein a reaction force of the second biasing force acts on the actuator.

2. The optical driving apparatus according to claim 1, wherein the second biasing force is smaller than the first biasing force.

3. The optical driving apparatus according to claim 1, wherein a distance between the second guide member and a position where the second biasing force is generated is shorter than a distance between the first guide member and the position where the second biasing force is generated, in a plane orthogonal to the optical axis direction.

4. The optical driving apparatus according to claim 1, wherein the second biasing force acts on the optical element holder between the second guide member and a center of gravity of the optical element holder with the optical element.

5. The optical driving apparatus according to claim 1, wherein the first biasing member generates the first biasing force as a magnetic force.

6. The optical driving apparatus according to claim 1, wherein the first rolling member includes a pair of rolling members configured to contact a first position and a second position of the first guide member, which are different from each other, in a first direction and a second direction, respectively, which are different from each other, in a plane orthogonal to the optical axis direction, and
wherein where a first rolling surface is a surface that passes through the first position and is orthogonal to the first direction, and a second rolling surface is a surface that passes through the second position and is orthogonal to the second direction, the first biasing member generates the first biasing force in a direction that internally divides an angle formed between the first rolling surface and the second rolling surface.

7. An optical driving apparatus comprising:
an optical element holder configured to hold an optical element;
an actuator configured to drive the optical element holder in an optical axis direction;
a first rolling member and a second rolling member each fixed rollably to the optical element holder;
a first guide member configured to contact the first rolling member and to guide the optical element holder in the optical axis direction;
a second guide member configured to contact the second rolling member and to restrict the optical element holder from rotating around the first guide member;
a first biasing member configured to generate a first biasing force that biases the optical element holder so that the first rolling member is pressed against the first guide member; and
a second biasing member configured to generate a second biasing force that biases the optical element holder so that the second rolling member is pressed against the second guide member, wherein a reaction force of the second biasing force acts on the actuator, and wherein one of the first guide member and the first biasing member is made of a magnetic material, and the other includes a magnet.

8. The optical driving apparatus according to claim 1, wherein the second biasing member is an elastic member.

9. The optical driving apparatus according to claim 1, wherein the second biasing member generates the second biasing force as a magnetic force.

10. The optical driving apparatus according to claim 9, wherein one of the second guide member and the second biasing member is made of a magnetic material, and the other includes a magnet.

11. The optical driving apparatus according to claim 1, wherein the actuator includes a movable portion and a fixed portion with which the movable portion is in pressure contact, and wherein the reaction force of the second biasing force acts as a force that presses the movable portion against the fixed portion.

12. An optical apparatus comprising an optical driving apparatus, wherein the optical driving apparatus includes:

an optical element holder configured to hold an optical element;

an actuator configured to drive the optical element holder in an optical axis direction;

a first rolling member and a second rolling member each fixed rollably to the optical element holder;

a first guide member configured to contact the first rolling member and to guide the optical element holder in the optical axis direction;

a second guide member configured to contact the second rolling member and to restrict the optical element holder from rotating around the first guide member;

a first biasing member configured to generate a first biasing force that biases the optical element holder so that the first rolling member is pressed against the first guide member; and a second biasing member configured to generate a second biasing force that biases the optical element holder so that the second rolling member is pressed against the second guide member, wherein the first biasing force biases the optical element holder toward the first guide member without biasing the optical element holder toward the second guide member, and wherein a reaction force of the second biasing force acts on the actuator.

13. An optical apparatus comprising an optical driving apparatus, wherein the optical driving apparatus includes:

an optical element holder configured to hold an optical element;

an actuator configured to drive the optical element holder in an optical axis direction;

a first rolling member and a second rolling member each fixed rollably to the optical element holder;

a first guide member configured to contact the first rolling member and to guide the optical element holder in the optical axis direction;

a second guide member configured to contact the second rolling member and to restrict the optical element holder from rotating around the first guide member;

a first biasing member configured to generate a first biasing force that biases the optical element holder so that the first rolling member is pressed against the first guide member; and a second biasing member configured to generate a second biasing force that biases the optical element holder so that the second rolling member is pressed against the second guide member, wherein a reaction force of the second biasing force acts on the actuator, and wherein one of the first guide member and the first biasing member is made of a magnetic material, and the other includes a magnet.

\* \* \* \* \*